United States Patent [19]

Humphreys et al.

[11] Patent Number: 4,813,070
[45] Date of Patent: Mar. 14, 1989

[54] TELEPHONE INTERCEPT SYSTEM

[75] Inventors: Robert E. Humphreys, Miami; Steven M. Gray, Coral Gables, both of Fla.

[73] Assignee: Royal Technology, Inc., Miami, Fla.

[21] Appl. No.: 122,758

[22] Filed: Nov. 19, 1987

[51] Int. Cl.4 .................... H04M 3/50; H04M 3/54
[52] U.S. Cl. ................................ 379/213; 379/212; 379/214
[58] Field of Search ............... 379/210, 211, 212, 213, 379/214, 201, 202, 204, 205, 206, 88, 67, 84

[56] References Cited

U.S. PATENT DOCUMENTS

| | | | |
|---|---|---|---|
| 3,793,487 | 2/1974 | Kilby | 379/74 |
| 3,858,006 | 12/1974 | Tomita | 379/73 |
| 3,989,901 | 11/1976 | Neuwirth et al. | 379/74 |
| 4,071,698 | 1/1978 | Barger, Jr. et al. | 379/84 |
| 4,446,337 | 5/1984 | Cofer | 379/207 |
| 4,670,628 | 6/1987 | Boratgis et al. | 379/211 X |

Primary Examiner—James L. Dwyer
Attorney, Agent, or Firm—Oltman and Flynn

[57] ABSTRACT

Intercept system for intercepting calls from a calling person to an unattended telephone connected to a telephone exchange having a three-way calling feature. The system includes at least one intercept console connected to the exchange, attended by an intercept operator and an intercept adaptor connected to the unattended telephone. The adaptor includes a ring detector for detecting ringing signals to the telephone, a circuit to generate a specific set of identifiable signature tones, an automatic dialer for accessing the three-way feature and for dialing the intercept console, an automatic stored digital code sender for sending a digital code to the intercept console identifying the unattended telephone to the operator; an apparatus for sending a start signal and a release signal from the console to the adaptor for respectively starting the voice message recorder and terminating the call in response to the operator answering the call and terminating the call.

35 Claims, 16 Drawing Sheets

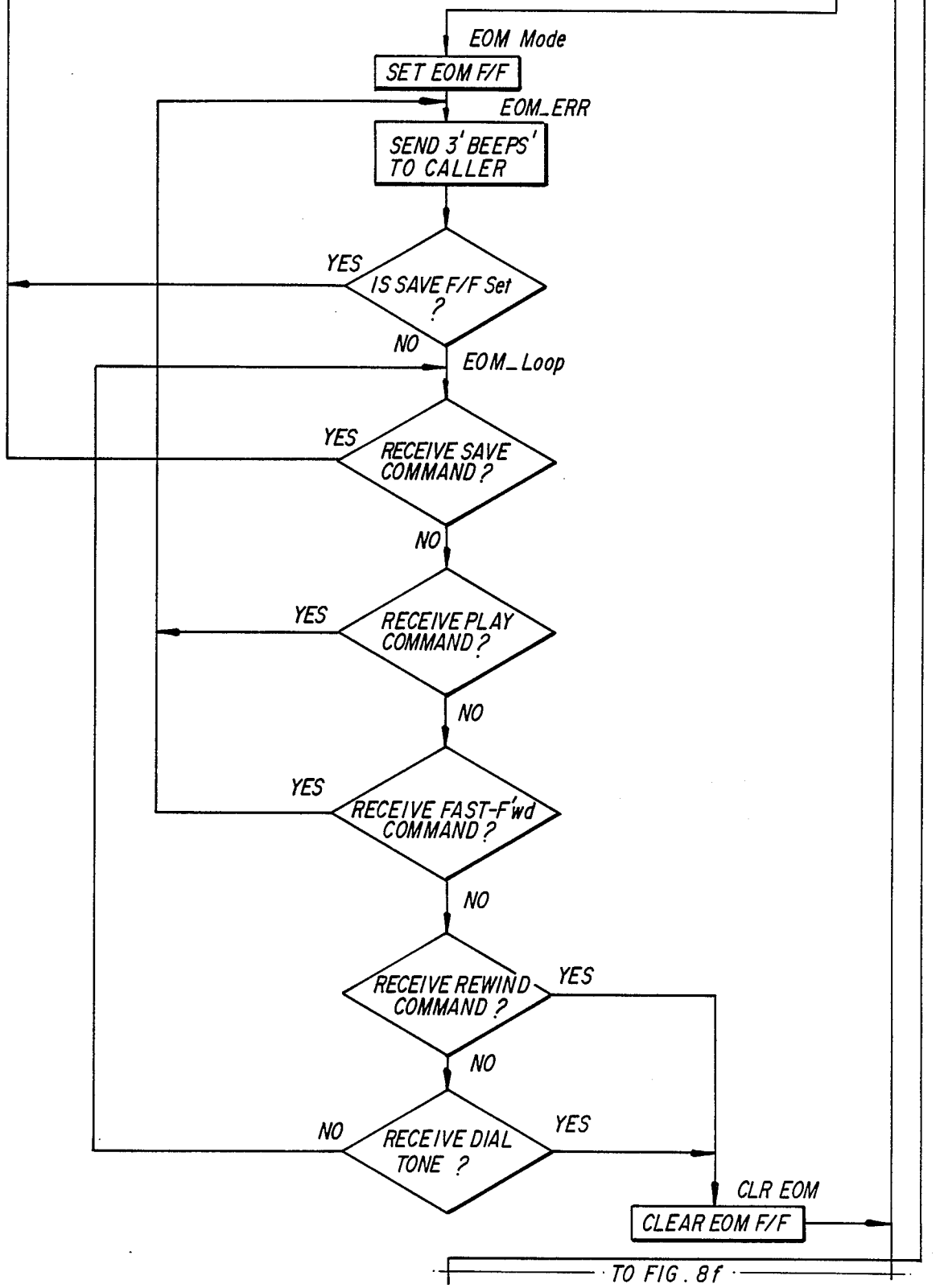

TELEPHONE INTERCEPT SYSTEM

The invention relates to telephone intercept systems and more particularly to a telephone intercept system based on the use of the three-way conference feature of a main telephone exchange.

BACKGROUND AND PRIOR ART

Telephone intercept systems, that serve to intercept telephone calls to a subscriber's telephone at such times when the subscriber is not available to answer his incoming calls, are well-known.

The intercept system of the prior art employ an intercept desk or console, staffed by intercept operators and are connected to the main telephone exchange via a number of intercept lines. Each intercept subscriber typically has a dedicated jack at the intercept desk which is identified there as that particular subscriber's jack, so that the intercept operator can answer the call, for example as "Mr. John Doe's telephone", using the proper personal or firm name for the intercepted telephone.

The intercept system of the prior art, however, require quite a substantial amount of hardware in order to perform these functions, consisting of an intercept concentrator at the telephone exchange which has on its input side a number of lines equal to the number of intercepting subscribers being connected to the intercept service, and on the output side a smaller number of lines call "intercept trunks" sufficient to carry the intercept telephone traffic. The concentrator also includes identifying means which identify the intercepted telephone, and transmits that identity to the intercept console via the intercept trunks. At the intercept premises, an intercept distributor is provided which connects the small number of intercept trunks to the larger number jacks.

The intercept systems of the prior art have other drawbacks. The telephone to be intercepted must be wired by movable jumpers at a cross-connect field directly to the intercept concentrator. The wiring and administration of these jumpers require a substantial effort from the telephone exchange maintenance staff.

A more recent technique of the intercept system prior art invovles the use of one of the custom features offered by most telephone companies and widely used by their subscribers called call-forwarding. This is a feature of the main telephone exchange whereby the subscriber's telephone is electronically connected to the intercept desk or console via circuitry located in the computer at the telephone exchange.

A common drawback, in the case of either of these examples of intercept systems of the prior art, is that the subscriber must always remember, at each day's end, to call the intercept service and inform the service personnel to activate the service; and in the morning it is necessary for the subscriber to deactivate the service. This is time consuming, and is sometimes forgotten, leading to loss of calls.

SUMMARY OF THE INVENTION

It is a primary object of the intercept system, according to the invention, to overcome the drawbacks of the intercept systems of the prior art; and it is a further object to provide further features of value to both the subscribers and the operators of an intercept system.

The intercept system, according to the invention, is based on the use of the so-called, three-way called feature, also commonly referred to as conference calling, now widely available as one of the custom calling features being provided by telephone companies as a premium service to their subscribers. The three-way calling service may differ somewhat in the details of its operation from place to place in various types of telephone exchanges. But, it provides in general the capability of a subscriber, having this service, to set up another telephone connection while engaged in a first connection without losing that first connection, and after having set up the second connection, combining the two connections into a three-way telephone conversation. The most commonly used mode of operation of the three-way calling feature is the mode of operation as follows: A first party, being engaged in a first telephone connection with a second party to the connection, first operates and releases the receiver button on his telephone one time to create a brief circuit interruption. This is called a "flash" of the switch hook. The telephone exchange apparatus detects the flash, and responds with three "beeps" and then a dial tone, while the second party is temporarily placed on "hold". The first party then dials the third party's telephone number and receives either a busy tone or a ringing tone. If the third party answers, the first and third party can converse, while the second party is still on hold. If the first party wishes to add the third party to the first connection he flashes the switch hook a second time and all three parties, now having a three-way connection, can converse with each other. If the third party does not answer his telephone, the second flash will restore the first connection between the first and second party. A forced disconnect of the third party is available for the first party, by means of a double flash, which will automatically disconnect the third party, if for some reason he does not hang up his telephone. The three-connection is automatically disconnected if the first party hangs up.

As mentioned above, there are various minor variations on the details of the mode of operation of the three-way calling feature, as it is provided by different telephone companies, using different types of telephone equipment. These variations, however, do not materially affect the operation of the invention.

It is also to be noted that private telephone exchanges, so-called PABX systems, sometimes offer that three-way calling feature and the instant application is equally applicable with those systems.

In its most basic form, the invention is an intercept system for use with telephone exchanges having three-way calling and includes one or more intercept operator consoles disposed at the premises of an intercept service central office, and a subscriber intercept adaptor disposed at the premises of the subscriber having intercept service, the adaptor being connected to the subscriber's telephone line and his telephone being connected to the intercept adaptor; the adaptor has a ring detector in order to respond to incoming telephone calls on the subscriber's telephone line; a ring counter; a multi-use timing circuit; a multi-use tone generator; a voice message generator to transmit intercept voice announcements to the caller; a hang-up detector; a dial tone detector; telephone line disconnect (interrupting) means; means to generate a series of standard DTMF dialing tones required to "dial" the telephone number of the intercept service central office; a decoder to recognize a subscriber identity request to be received from the intercept service central office computer; means to trigger the transmission of a series of security code DTMF tones identifying the subscriber's telephone to intercept service central office computer; a decoder to recognize an acknowledgement tone from the intercept service central office computer; means to initiate the second flash of the switch hook and thus complete the two functions required for making a three-way connection; and, a circuit providing means to recognize a disconnect command, so as to hang-up and reset all the circuits in the intercept adaptor.

According to a further feature of this invention, the intercept adapter, upon automatically answering an incoming telephone call, includes the use of its multi-use tone generator to transmit to the caller a particular set of informative tones, known as "signature tones", specifically to inform the caller that the telephone being called will be, at this time, connected to a specific intercept service.

According to a further feature of this instant invention, the intercept adaptor includes a selector switch the use of which will provide privacy for the subscriber, uninterrupted by the ringing of the telephone; a decoder to recognize a tone sent by the intercept service operator, and,an electronic ringer as means for the intercept operator solely to be able to alert the subscriber of a desired call or in event of emergency.

According to a further feature, the intercept adaptor includes a tape recording and transcribing machine, controlled by special circuitry in the intercept adaptor which responds to commands generated by the subscriber by pressing buttons on the control panel of the intercept adaptor, or to tone commands generated at the intercept central office by the intercept service operator through the use of specially-provided pushbuttons on the intercept operator's console, or alternatively by the subscriber through the use of any other telephone with a "touch-tone" dial pad which is connected to the telephone network anywhere in the world.

According to a further feature, the invention includes a microprocessor control circuit in the intercept adaptor in engagement with and controlling the mutual cooperation between the ring detector, ring counter, line-seize circuit, timer, tone generators, voice message generator, hang-up detector, flash circuit, DTMF tone generator, tone decoders, programming circuit, tape machine controller, electronic ringer and disconnect and reset circuits.

According to still another feature, the invention includes means of storing in memory the fact that messages have been recorded on the intercept adaptor tape recorder; means of counting such messages; means of generating an audible "beep" and to "blink" an LED to notify the subscriber when in the physical presence of the intercept adaptor; means of generating and transmitting a series of tones at a selected moment, when the intercept adaptor has responded to a telephone call, which will notify the subscriber in the event he is seeking to determine remotely if there are messages waiting to be transcribed.

According to still another feature, the adaptor circuitry includes means by which a subscriber, through the use of a "touch-tone" dial telephone, can communicate to the intercept adaptor his desire to retrieve the messages recorded on the intercept adaptor tape recorder; which means includes all of the usual switching capability of a tape recorder/player for controlling the play functions of the tape; and which means also includes circuitry providing a choice for the subscriber to discard or "save" the messages on the tape.

In accordance with still a further feature, the intercept adaptor includes an electronic clock having a clock output and being selectively programmable for respectively activating and deactivating the intercept adaptor at selected times.

In accordance with still a further feature, the clock includes a calendar for respectively activating and deactivating the adaptor at selected times or on selected dates.

According to yet another feature, the invention includes means through special circuitry in the intercept adaptor, by which the adaptor can be programmed remotely by telephone, by command codes generated from a DTMF tone generator; which means include the ability to program or reprogram the adaptor with a subscriber identity code which will be transmitted to the intercept service central office computer to identify the telephone which is being intercepted; which means also provide for programming or reprogramming the intercept adaptor with the speed dial code or the seven digit telephone number the adaptor is required to "dial" when activated to perform a conference function; and which means also include the ability to remotely command the adaptor to either cease or commence providing service to the subscriber.

Further objects, features and advantages which may be included in this invention will be apparent from the following detailed description of a presently preferred embodiment which is illustrated schematically in the accompanying drawings.

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

DESCRIPTION OF THE PREFERRED EMBODIMENTS

Figure 1:
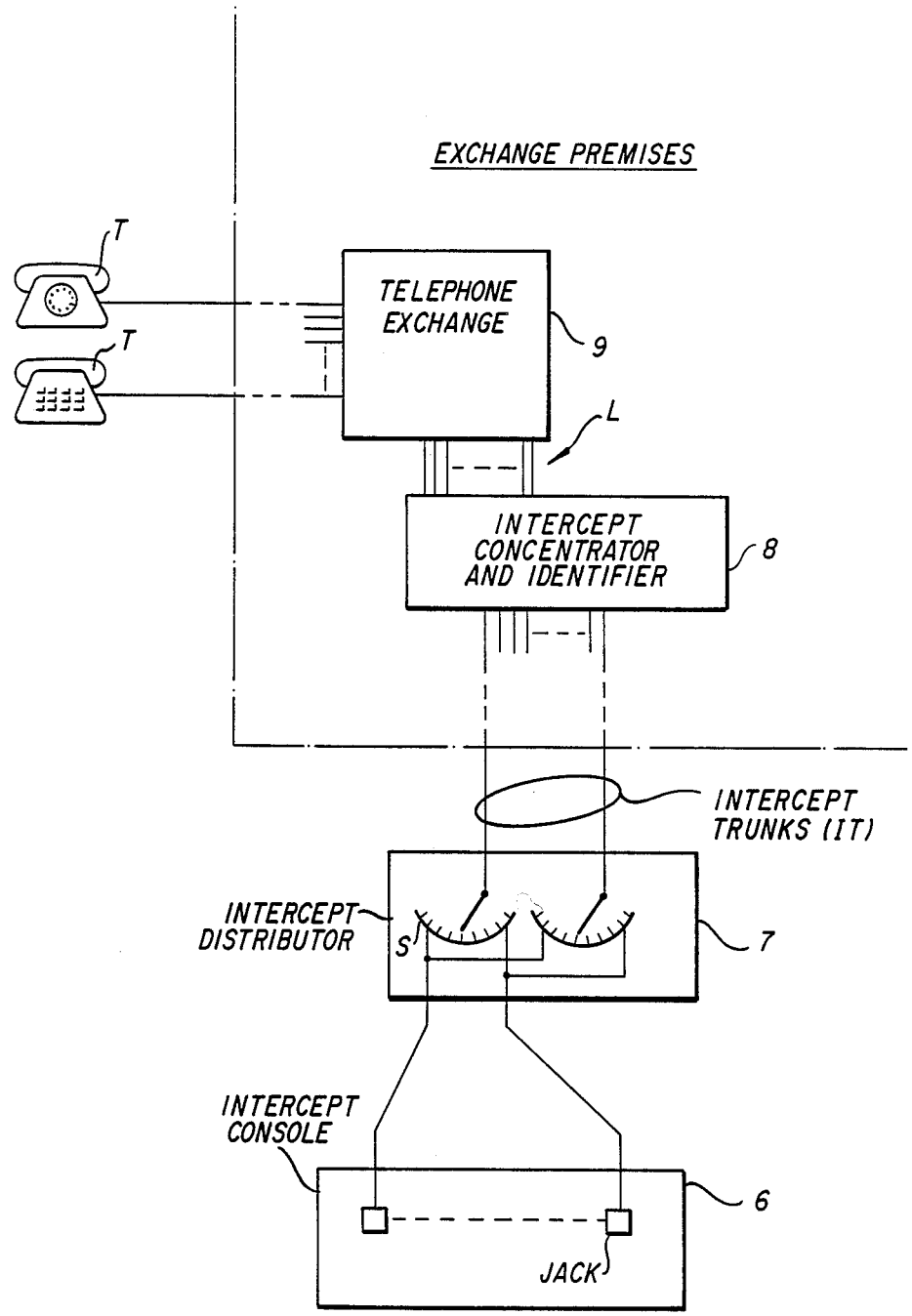
FIG. 1 is a block diagram of an intercept system according to the prior art.

FIG. 1 shows an intercept system, also generally known as an "Answering Service" according to the prior art. Two subscriber telephones T are seen connected to a telephone exchange 9 and an intercept concentrator 8 with an identifier connected via a group of intercept lines L, being at least equal to the number of subscriber telephones having intercept service, to the exchange and via a small group of trunks T to an intercept distributor 7 having a plurality of the distributor switches 5 having a number of outputs being at least equal to the number of lines L, each connected to an intercept console 6 having a number of jacks at least equal to the number of intercept lines L. The intercept console is attended by intercept operators being able to answer each incoming call with a plug connected to the operator's telephone or headset, not shown.

Figure 2:
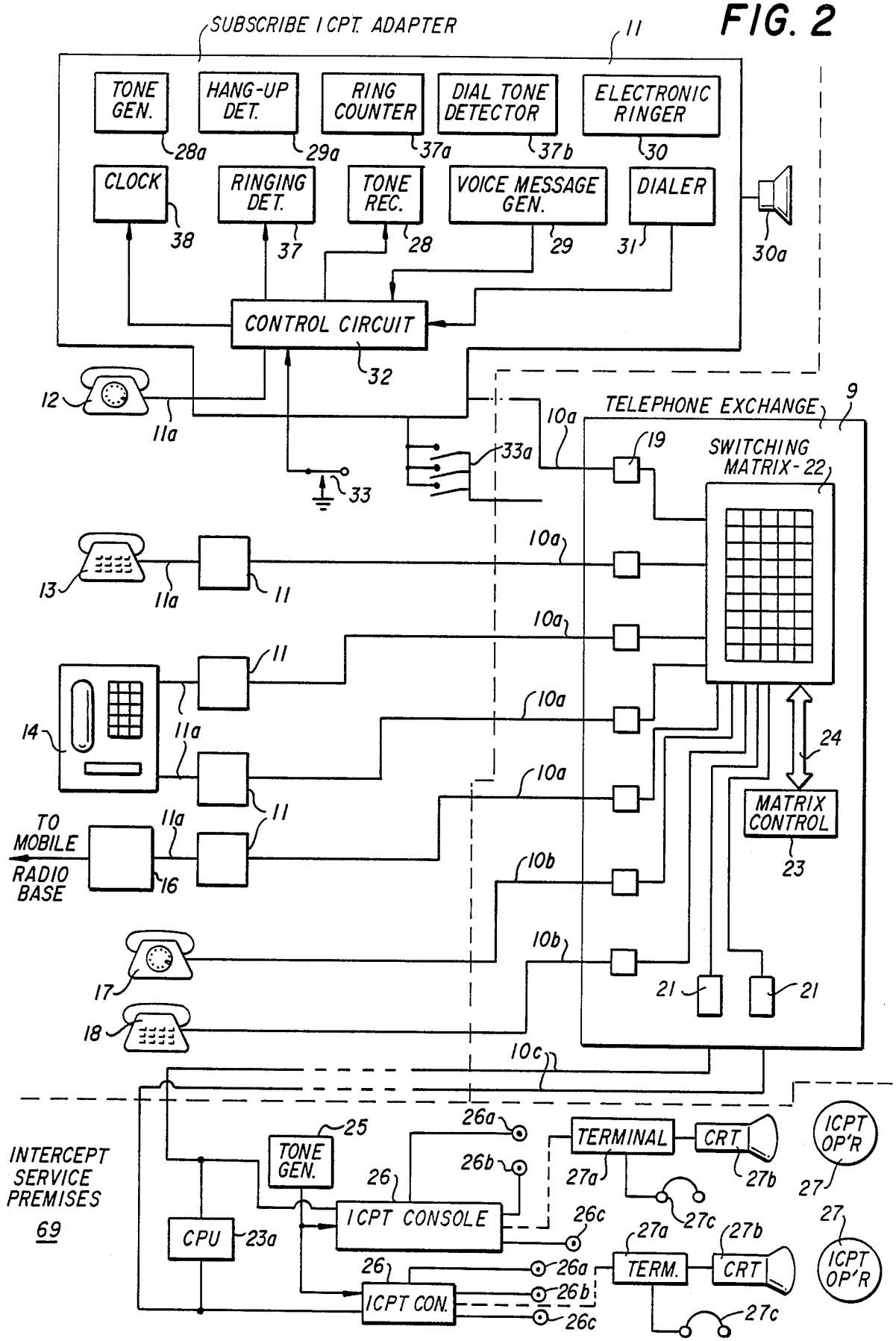
FIG. 2 is a block diagram of an intercept system according to the invention, showing a plurality of telephones of different types being connected, via a telephone exchange having a three-way calling feature, to an intercept console.

FIG. 2 shows an intercept system according to the instant invention.

A number of telephones 12-18 of various types are shown connected to a telephone exchange 9.

The telephones may be of various types, such as a conventional rotary telephone 12, a "touch-tone" telephone 13, a key telephone or PABX 14, a mobile phone adaptor 16, wherein each telephone line 10a has an intercept adaptor 11 connected at one side to the telephone exchange 9 and at the other side to telephone 12-16. Two standard telephones 17,18 have no intercept service and accordingly no intercept adaptor in their line 10b.

The telephone exchange 9 typically has a switching matrix 22 of any type controlled by a matrix control via a control bus 24. The telephone exchange 22 must be of a type having the three-way calling feature and advantageously another of the widely available custom calling features provided by telephone companies called "speed dialing" and another standard feature common to most telephone exchanges known as line group hunting, ground start, or the like.

An intercept service having intercept consoles 26 is seen connected to the telephone exchange 9 via lines 10c through two line adaptors 21 which may be ordinary line circuits similar to the line circuits 19 connecting the telephone 12-18 to the exchange 9, or they may advantageously be line circuits arranged for ground start, which is a feature often provided to avoid two-way collision between incoming and outgoing calls.

Each intercept console is attended by an intercept operator 27, who is connected to the console by a telephone headset or an ordinary telephone.

Figure 3:
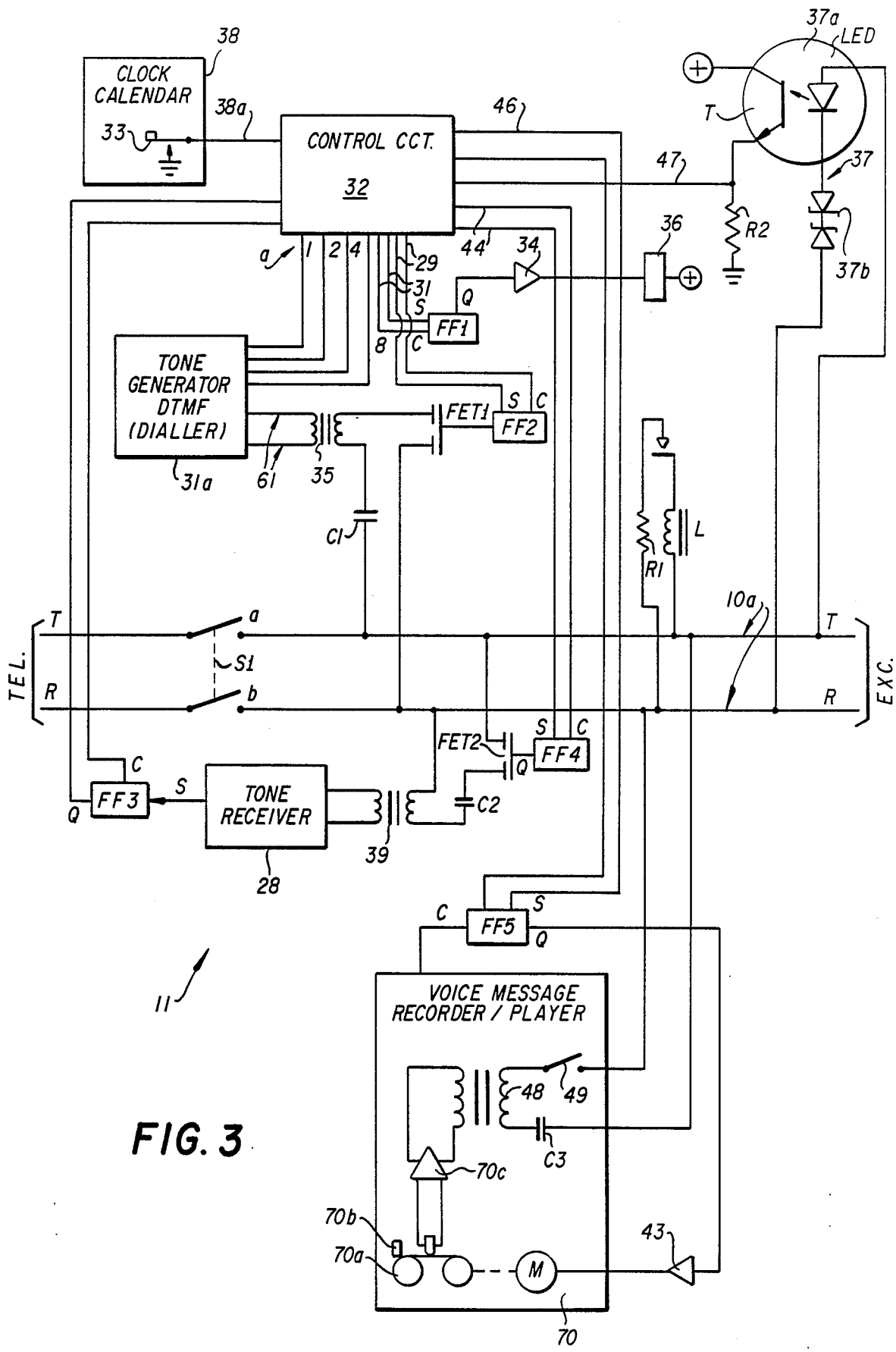
FIG. 3 is a schematic circuit diagram of the intercept adaptor, showing circuit details thereof.

Each operator has at her disposal a pushbutton 26a, which when operated, connects or disconnects the operator to the call and a second pushbutton 26b which, when operated, starts the tape recorder mechanism FIG. 3,70, in the subscriber intercept adaptor 11. In a further adaptation of the invention the signals generated by pushbuttons 26a and 26b may be generated by designated buttons of a "touch-tone" dial pad.

The subscriber intercept adaptor 11, connected to the telephone 12, is shown with its major elements, which include a ring detector 37, a tone receiver 28, a tone generator 28a, a voice generator 29, a hang-up detector 29a, a clock 38, and an adaptor microprocessor control circuit 32. A single pole single throw locking switch 33, is connected to the control 32, which when engaged activates the intercept adaptor into a "ready" mode.

A triple pole double throw selector switch 33a, provides a "privacy" feature for the subscriber by disconnecting the telephone 12-16 from the telephone line 11a, so that when a call is received the telephone 12-16 will not ring, but the intended function of the intercept adaptor will transfer the call to an intercept console 26 at the intercept service central office 69 to be handled by an intercept operator 27. During the time the privacy selector switch 33a is in the "privacy" mode, an LED not shown "blinks" to advise the subscriber of the current mode of the intercept adaptor.

In operation, the locking switch 33, has been operated to activate the intercept adaptor 11 to be responsible to incoming calls to be intercepted and the subscriber is advised of the current mode of the intercept adaptor by means of an LED not shown, which illuminates steady in the activated or "ready" mode and "blinks" during the deactivated mode.

The control circuit 32, which is essentially a sequencing circuit, may be constructed according to any suitable technology, such as wired logic or programmed array logic, or advantageously as a stored program controller based on a microcomputer compatible with the extensiveness of the "software".

While it must be recognized that other embodiments of this invention are workable, and perhaps more economically practical within the current state-of-the-art, the following description, for the sake of clarity, utilizes a maximum of "hardware" and a minimum of "software".

FIG. 3 shows the intercept adaptor 11 in more detail, and the following shall describe the "MESSAGE TAKING" process of the system in connection with a complete intercept operation.

An incoming call appears on the line 10a at the right-hand side as a ring voltage signal, typically 60-100 volts RMS, appearing on the two conductors T and R of the line 10a. "Ringing" is detected by the ring detector 37, typically consisting of an opto-coupler 37a having its input LED connected to the line 10a through two opposing zener diodes 37b providing a threshold of typically 25 volts.

The opto-coupled LED activates the base of the built-in transistor T which is emitter-coupled via a ground connected resistor R2 to an input 47 of the control circuit 32. The control circuit 32 in response operates a line holding relay 36 via a flip-flop FF1 having its set and clear pin S and C respectively connected by leads 31 to control 32.

If the subscriber has activated the "privacy" switch S1, the control circuit 32 will respond to ring detector 37 at the voltage rise of the first ring and cause relay 36 to be activated so as to "seize" the line and begin the three-way calling sequence. On the other hand if the "privacy" switch S1 has not been activated ring counter 37a will count a predetermined number of rings. Typically, after the fourth ring is counted control circuit 32 will cause relay 36 to be activated so as to "seize" the line.

The relay 36 closes its make contacts to provide a holding shunt of inductor L in series with resistor R1 across T and R of the line 10a, which closes a dc-loop to the telephone exchange 9, which in turn stops the ringing voltage sequence and completes a voice connection to the calling party. At the same time, the control circuit 32, through reference to "software" stored in an Eraseable Programmed Read Only Memory (EPROM), which is an integral part of the circuitry of the intercept adaptor 11, starts its reference to clock 38 and activates tone generator 28a to transmit to the caller a specific set of identifying "signature tones". Control circuit 32 then activates hang-up detector 29a and voice message generator 29. If previously recorded but unretrieved messages are on the tape of recorder/player mechanism 70, control circuit 32 then activates tone generator 28a to transmit a set of soft, distinct tones to notify the caller, who may be in any case the subscriber seeking his messages; if there are no previously recorded messages waiting to be retrieved the control circuit 32 will then cause line holding relay 36 to momentarily open its make contacts sending a "flash" signal to the telephone exchange 9 initiating the first required function of the three-way calling feature and then, advantageously in DTMF (Dual Tone Multi Frequency) Code, control circuit 32 will cause, as has been predetermined, either a speed dial code or the seven digit telephone number of the intercept service central office number to be transmitted onto line 10a.

The digits are sent in the conventional manner one digit at a time, by tone generator 31a under the control of control circuit 32 via the binary weighted leads a1,a2-,a4 and a8, and are coupled to the telephone line 10a via a transformer 35, having its secondary connected to line 10a through an FET-transistor FET1 and a capacitor C1. The FET1 is turned on by control circuit 32 via flip-flop FF2, having its ouput pin Q connected to the gate of FET1 and its set and clear inputs S and C connected to control circuit 32 via leads 31, so that FET1 is on only during sending of the tones to avoid loading the telephone line when conversation is carried on the line between the calling party and the intercept operator. After the intercept service telephone number has been transmitted by tone generator 28a the telephone exchange 9 is connected automatically, through switching matrix 22 and matrix control 23 connects automatically, by means of the line hunting feature of maxtrix control 23, and through connection 24 to the first available line 10c of a group of telephone numbered lines assigned to the intercept service central office 69 and connected to its Central Processing Unit 23a (CPU) FIG. 2.

The CPU 23a, having responded to and accepted the incoming telephone call will first seek to identify through which intercept adaptor 11 and thus at what particular subscriber premises the particular telephone call was processed.

Figure 6:
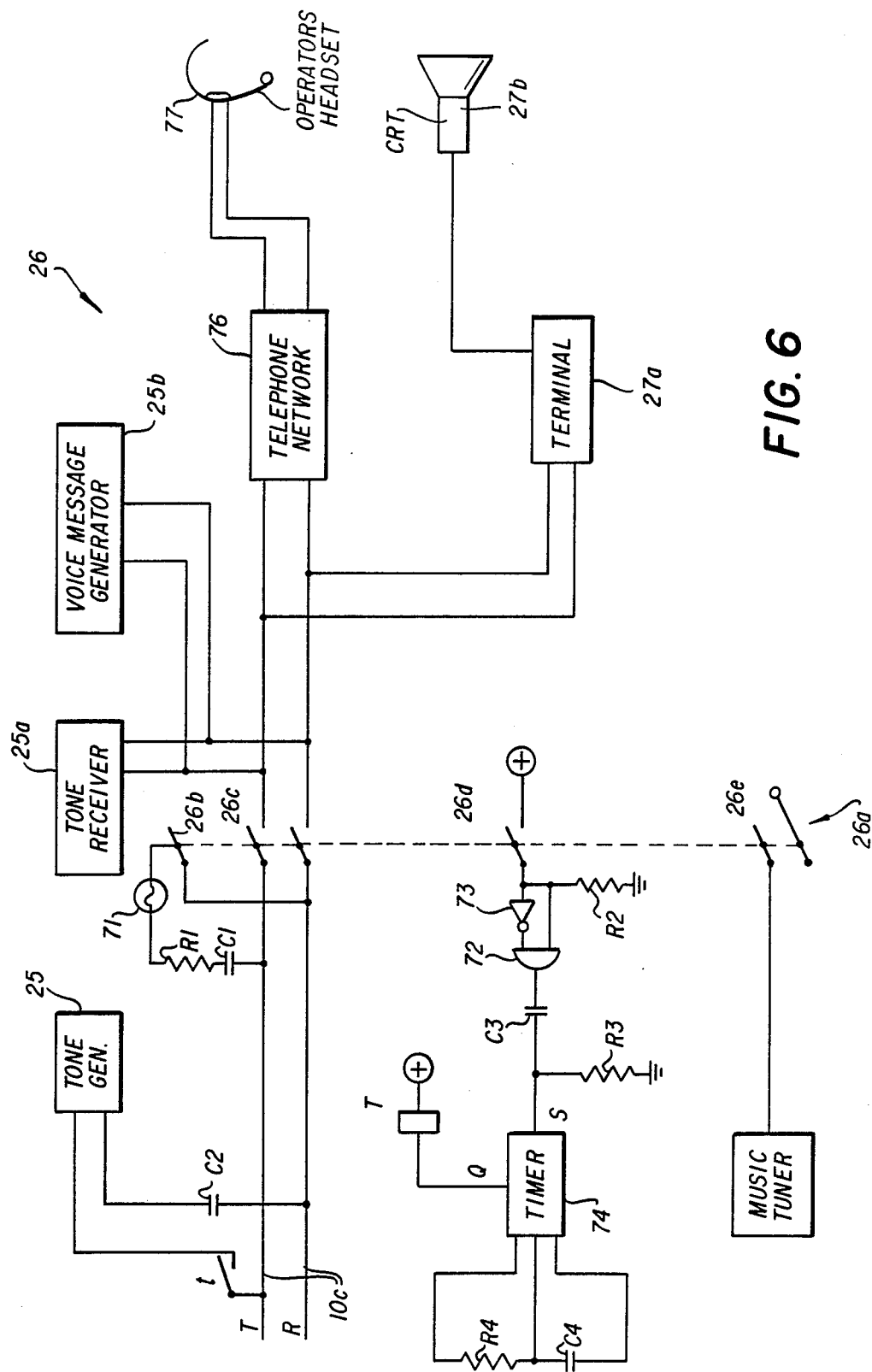
FIG. 6 is a schematic circuit diagram of the intercept operator's console.

Accordingly, the CPU 23a will cause a tone called SIR (Subscriber Identification Request) to be transmitted from its tone generator 25, FIG. 6, onto telephone line 10c, which through telephone line 10a will be received by intercept adaptor 11 and decoded by tone receiver 28, which in turn, will cause intercept adaptor tone generator 28a to transmit a series of tones back to the CPU 23a called SID (Subscriber Identification) tones via telephone lines 10a, to be received by the intercept service central office 11 through telephone lines 10c and by tone receiver 25a.

The SID, having been received by the CPU 23a, decoded and validated by tone receiver 25a, will cause the CPU 23a to activate tone generator 25 to transmit still another tone back to intercept adaptor 11 called SIA (Subscriber Identification Acknowledgement) via the known telephone line connections to be received by and decoded by tone receiver 28.

Having achieved these sequential functions, called a "hand-shake", the control circuit 32 in intercept adaptor 11 will now perform the second required three-way calling function by sending a "flash" signal to the telephone exchange 9, which, within its matrix control 23, will then automatically implement the three-way calling feature reconnecting the first party.

The intercept adaptor 11, the caller, and the intercept service central office 69, through CPU 23a, are at this time connected in a conference calling mode via the three-way calling feature.

Should this automatic communication effort fail, on the part of intercept adaptor 11, to make proper connection with the intercept service central office 11, due to all the ingoing lines to the CPU 23a being "busy", or for any other reason, the calling party will, in the event of busy lines, hear a short burst of the "busy" signal, and in any case the caller will receive a second voice message which control circuit 32 of the intercept adaptor 11 will cause to be generated by voice message generator 29, and the sequence will begin again from the first function required to achieve a three-way connection.

After achieving a "hand-shake" the CPU 23a will seek to find an available operator 27 to whom this telephone call would be transferred. Should no operator be available at the time the CPU 23a will cause a voice message, "please hold for an available operator", to be generated by voice message generator 25b, FIG. 6. During any interim period, until an operator becomes available, CPU 23a will automatically operate switch 26e, FIG. 6, and cause music to be transmitted onto telephone line 10c.

When an operator 27 becomes available, the CPU 23a will deactivate switch 26e and transfer the call to the available terminal 27a of the intercept console 26, and notify the operator 27 in attendance by displaying the details of the call on the terminal CRT 27b. The details of the call will include, among other pertinent details, the subscriber's account number and name related to the particular intercept adaptor 11 through which this particular call has been processed.

More important to the moment, the terminal CRT 27b will provide the telephone "greeting" to be used in answering the telephone for the particular subscriber whose intercept adaptor 11 has processed and caused this telephone call to be transferred via the three-way calling feature to the intercept service premises 69.

If the subscriber in control of the intercept adaptor 11 through which this particular call was processed has activated "privacy" switch 33a, on intercept adaptor 11, at the instant CPU 23a connects operator 27 headset 27c to the telephone call waiting on line 10c, a series of "beeps" will be generated by tone generator 28a in intercept adaptor 11 and transmitted through the known telephone connections so that operator 27 is notified of this subscribers desire to maintain "privacy", thus allowing her to conduct the interview with the caller accordingly.

Having determined that the calling party wishes to leave a message for the subscriber the operator 27 will send a command via the known telephone connection to the tape recorder/ player mechanism 70 located at the subscribers premises in intercept adaptor 11 by pressing a "start record" button 26a on terminal 27a which will cause a tone to be generated by tone generator 25 of intercept console 26 and transmitted over telephone lines 10c and 10a to intercept adaptor 11 to be received by its tone receiver 28 and decoded; which will cause the control circuit 32 of intercept adaptor 11 to start recorder mechanism 70 so as to record both sides of the conversation between the calling party and the operator.

Figure 4:
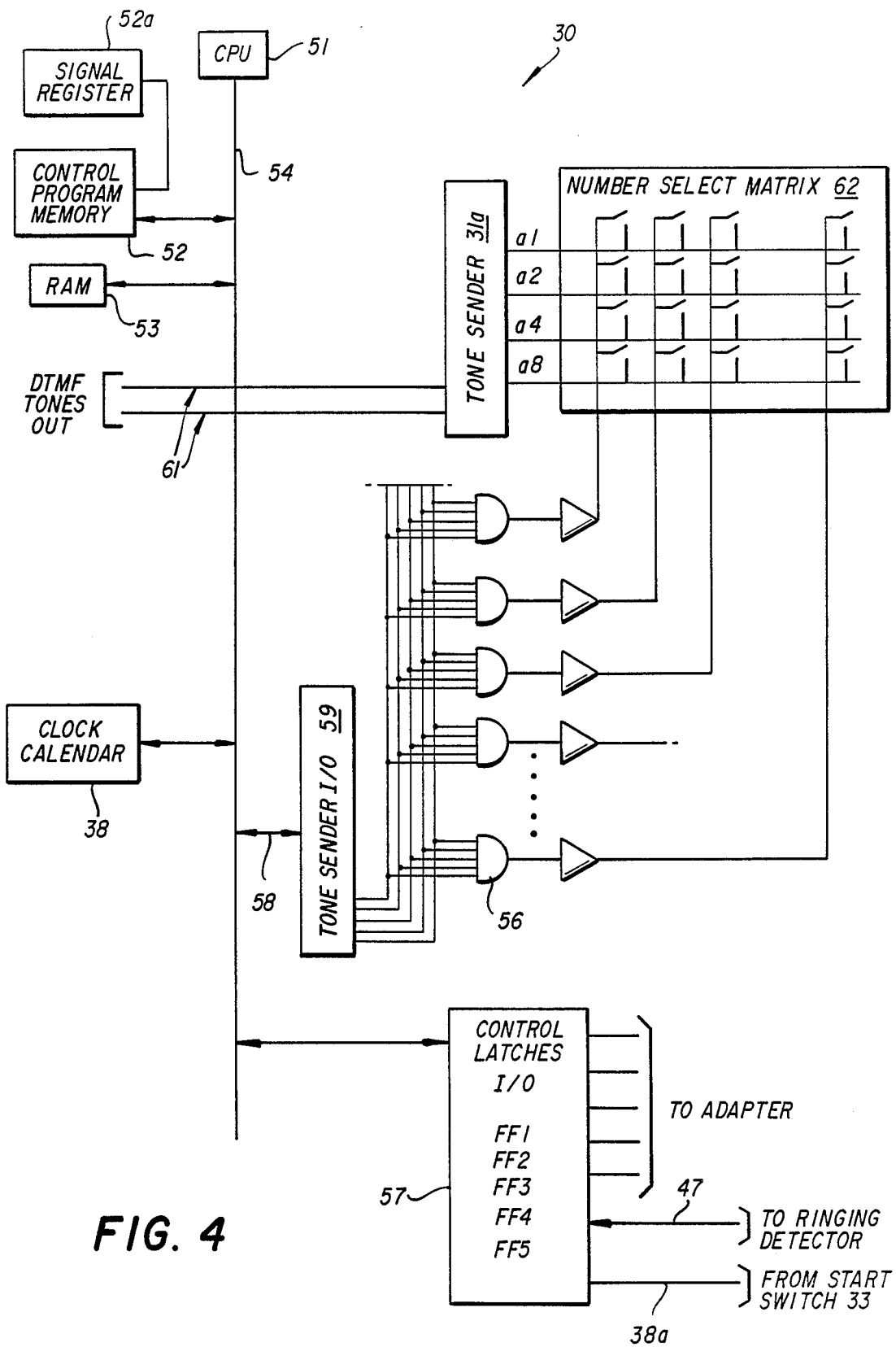
FIG. 4 is a circuit diagram of the control console circuit for the intercept adaptor.
Figure 5:
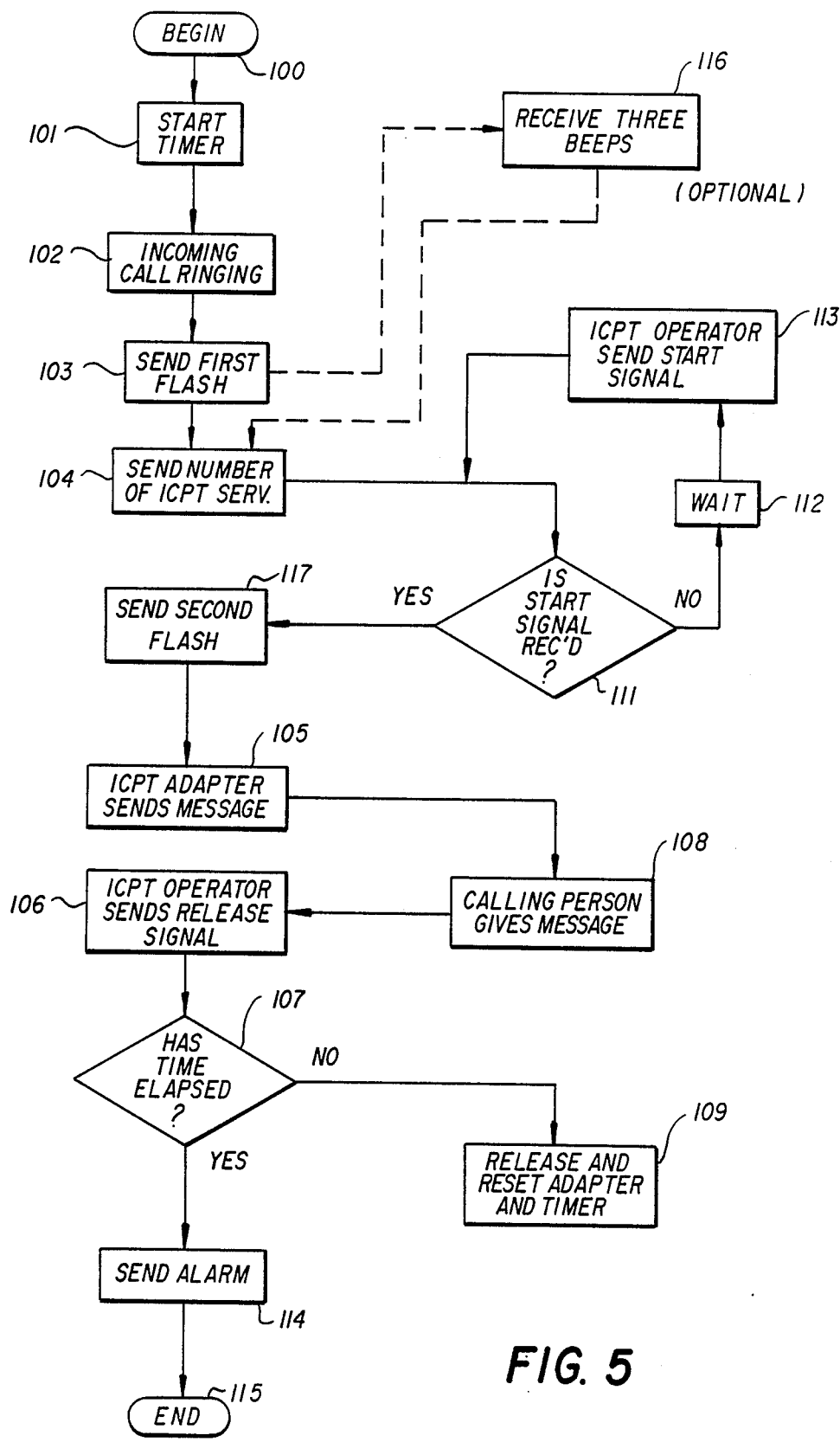
FIG. 5 is a flow-chart showing the sequence and steps of a typical intercept operation according to the instant invention.

Within the voice message record mechanism 70, there is a monitoring tape 70a, and a motion sensor 70b. Having given the command to record mechanism 70 to "start", the motion sensor 70b will sense that recording tape 70a is actually moving. The normal movement of tape 70a will accumulate a given number of signals which will span a period of typically eight seconds at which time control program memory 52 FIG. 4, will cause control circuit 32 to cause tone generator 28a to transmit a "beep" on telephone line 10a. This beep provides notice to the intercept operator 27, at the intercept console 26 that the recording tape 70a in the subscribers intercept adaptor 11 is operational; at the same time this is to satisfy the law in some areas that a telephone recording must be accompanied by a "legal beep" of at least one second's duration, every eight seconds. Should intercept operator 27 determine that record mechanism 70 of intercept adaptor 11 is inoperable, the conventional method of message taking and storage in computer memory by means of CPU 23a will be used.

If it is determined by operator 27 that the subscriber has elected to be on "privacy" and the telephone call is from a party relating to instructions appearing on CRT 27b indicating that the subscriber is to be notified in the event a call is received from this particular caller, or in the event this call is deemed by operator 27 to be an emergency, then operator 27 will press pushbutton 26c causing tone generator 25 to send a tone over the known telephone connects to tone receiver 28 in intercept adaptor 11 which will cause control circuit 32 to activate electronic ringer 30 to transmit a ring sound through speaker 30a so as to audibly notify the subscriber at the subscriber premises at intercept adaptor 11 of operator 27 having a need for the subscriber to respond personally to this call.

Under the usual message-taking procedure, however, the caller's name, telephone number, and the message to be left by the caller has not been recorded on tape 70a of voice record mechanism 70, and the operator 27 at the intercept service central office 69 will terminate the conversation; then, while recorder mechanism 70 is still running, operator 27 will announce the "date" and "time" the message was taken for reference by the subscriber. The operator 27 will then press the "hang-up" button 26b on terminal 26, causing CPU 23a to activate tone generator 25 to transmit a "hang-up" command tone onto telephone line 10c and thus to intercept adaptor 11 via telephone line 10a to be received by tone receiver 28 which will cause intercept adaptor circuit 11 to: operate relay 36 and release telephone line 10a; stop recorder mechanism 70; cause control program memory 52 to retain in "memory" that a message has been recorded on the tape 70a and accumulate the "count" of the number of messages which have been recorded since the last message retrieval function; turn on an intermittent audible "message waiting" beep through speaker 30a in intercept adaptor 11; and also, turn on the "message waiting" LED not shown in intercept adaptor 11; and reset all of the circuits of control circuit 32 in readiness for the next incoming call.

The following shall describe the "MESSAGE RETRIEVAL" process of the system:

A subscriber seeking to retrieve "messages waiting" on tape 70a of recorder mechanism 70 may do so, and listen to them locally through speaker 30a through the use of the pushbuttons not shown on the control panel of intercept adaptor 11, which provide the usual tape recorded control functions such as "rewind", "fast-forward", "play", "stop" and one other called "save". The "save" feature is provided in the event it is desirable to keep, for some period of time, all or part of the messages previously recorded on tape 70a. When activated, control circuit 32 will cause the drive mechanism of recorder mechanism 70 to advance tape 70a to the end of the last recorded message and stop there in readiness to record any subsequent messages.

Alternatively, the subscriber may choose to retrieve any messages waiting from some remote location, through the use of any "touch-tone" telephone. The following shall describe a complete operation of the intercept message retrieval process.

From a "touch-tone" telephone any place in the world's telephone network, a subscriber may cause an incoming call to appear on line 10a at the right-hand side as a ring voltage signal, typically 60-100 volts RMS, appearing on the two conductors T and R of the line 10a. "Ringing" is detected by the ring detector 37, typically consisting of an opto-coupler 37a having its input LED connected to the line 10a through two opposing zener diodes 37b providing a threshold of typically 25 volts.

The opto-coupled LED activates the base of the built-in transistor T which is emitter-coupled via a ground connected resistor R2 to an input 47 of the control circuit 32.

The control circuit 32, in response, operates a line holding relay 36 via a flip-flop FF1 having its set and clear pin S and C respectively connected by leads 31 to control 32.

If the subscriber has activated the "privacy" switch S1 control circuit 32 will respond to ring detector 37 at the voltage rise of the first ring and cause relay 36 to be activated so as to "seize" the line and begin the three-way calling sequence. On the other hand if the "privacy" switch S1 has not been activated ring counter 37a will count a predetermined number of rings. Typically, after the fourth ring is counted control circuit 32 will cause relay 36 to be activated so as to "seize" the line.

The relay 36 closes its make contacts to provide a holding shunt of inductor L in series with resistor R1 across T and R of the line 10a, which closes a dc-loop to the telephone exchange 9, which in turn stops the ring voltage sequence and completes a voice connection to the calling party.

At the same time, the control circuit 32, through reference to "software" stored in an Eraceable Programmed Read Only Memory (EPROM), which is an integral part of the circuitry of the intercept adaptor 11, starts its reference to clock 38 and activates tone generator 28a to transmit to the caller a specific set of identifying "signature tones". Control circuit 32 then activates hang-up detector 29a and voice message generator 29. If previously recorded but unretrieved messages are on tape 70a or recorder/player mechanism 70, control circuit 32 then activates tone generator 28a to transmit a set of soft, distinct tones to so notify the caller, who, in this case, will be the subscriber seeking his messages.

Recognizing the distinct tones as notice of "messages waiting", the subscriber is required, within a short time period, typically two seconds, to cause the telephone set from which the call is placed, to transmit the first digit of at least a four digit SID (Subscriber Identification Code). Having achieved this through the use of the "touch-tone" pad of the telephone, the subscriber now has a longer time period, typically ten seconds, to transmit the remaining three digits.

If an error has been made, or someone not knowledgeable of the correct SID has attempted to breach the security of the subscribers "protected" messages in storage in the subscribers intercept adaptor 11, instead of completing the process of message retrieval, after a time period, typically five seconds, since tone receiver 28 did not receive the correct SID, control program member 52 will prompt control circuit 32 to cause tone generator 28a to transmit a series of tones to notify the subscriber, in case a mistake in the entry of the SID has been made. Control circuit 32 will allow for another attempt to receive a correct SID and if none is received control circuit 32 will cause relay 36 to be deactivated and thereby release line 10a. The purpose of the five-second time delay after the entry of an error in the SID sequence is to defeat a security violator's efforts to learn the correct SID by "trial and error".

Having achieved the entry of a correct SID, control program memory 52 will prompt control circuit 32 to cause tone generator 28a to transmit a series of tones, the number of which will be equal to the number of individual "messages waiting" on the tape 70a of recorder mechanism 70 as a secondary advantage, while the primary advantage of this notice is to notify the subscriber that tone receiver 28 has received the correct SID and, therefore, control circuit 32 has caused the recorder mechanism 70 to commence the tape "rewind" process in order to get to the beginning of the messages to be retrieved. This is necessary due to the extended period of silence to be experienced while tape 70a is rewinding.

At the instant control circuit 32 caused the recorder mechanism 70 to commence to "rewind" tape 70a, a digital entry of "0" was made in signal register 52a, related to control program memory 52. Intermittent signals received from motion detector 70b are accumulated and stored in control circuit 32 which, when referenced to the original input of "0", indicate the point on tape 70a where the previously recorded messages ended, providing the means for control circuit 32 to recognize the "end of messages" when this point on tape 70a reappears.

When tape 70a, in recorder mechanism 70 has reached the beginning of the tape, motion detector 70b will indicate to control circuit 32 that tape 70a has stopped. Control circuit 32 will then cause the control mechanism of recorder mechanism 70 to drive tape 70a in the forward direction at "play" speed and in the "play" mode. The subscriber may now listen to the messages sequentially from message one through all those recorded on tape 70a, or alternatively the subscriber may take control of the movement of tape 70a in recorder mechanism 70 through the use of appropriate digits on the "touch-tone" pad of the telephone being used.

In so doing, via tone receiver 28, control program memory 52 and control circuit 32, tape 70a may be caused to "stop", "rewind", "fast-forward" and "play". When the subscriber is finished listening to the messages, a choice may be made to "dispose of", or "save", the messages.

If the messages are to be disposed of, the subscriber will simply hang-up the telephone and control circut 32 will be prompted by control program memory 52 to cause recorder mechanism 70 to rewind tape 70a to the beginning of the tape in readiness to record over any previously recorded messages as succeeding messages are received.

If, on the other hand, the subscriber wishes to "save" part or all of the messages on tape 70a, this is achieved by use of the appropriate digit on the "touch-tone" pad of the telephone being used, in which case a tone will be received by tone receiver 28, which will cause control program memory 52 to recognize the "save" command; and, via control circuit 32, will further cause control program memory 52 to operate record mechanism 70, so as to advance tape 70a until the original stored "0" point is reached. At this point control program memory 52 will cause control circuit 32 to stop record mechanism 70; operate relay 36 to release telephone line 10a; and reset all circuits in readiness for the next telephone call.

Figure 7A:
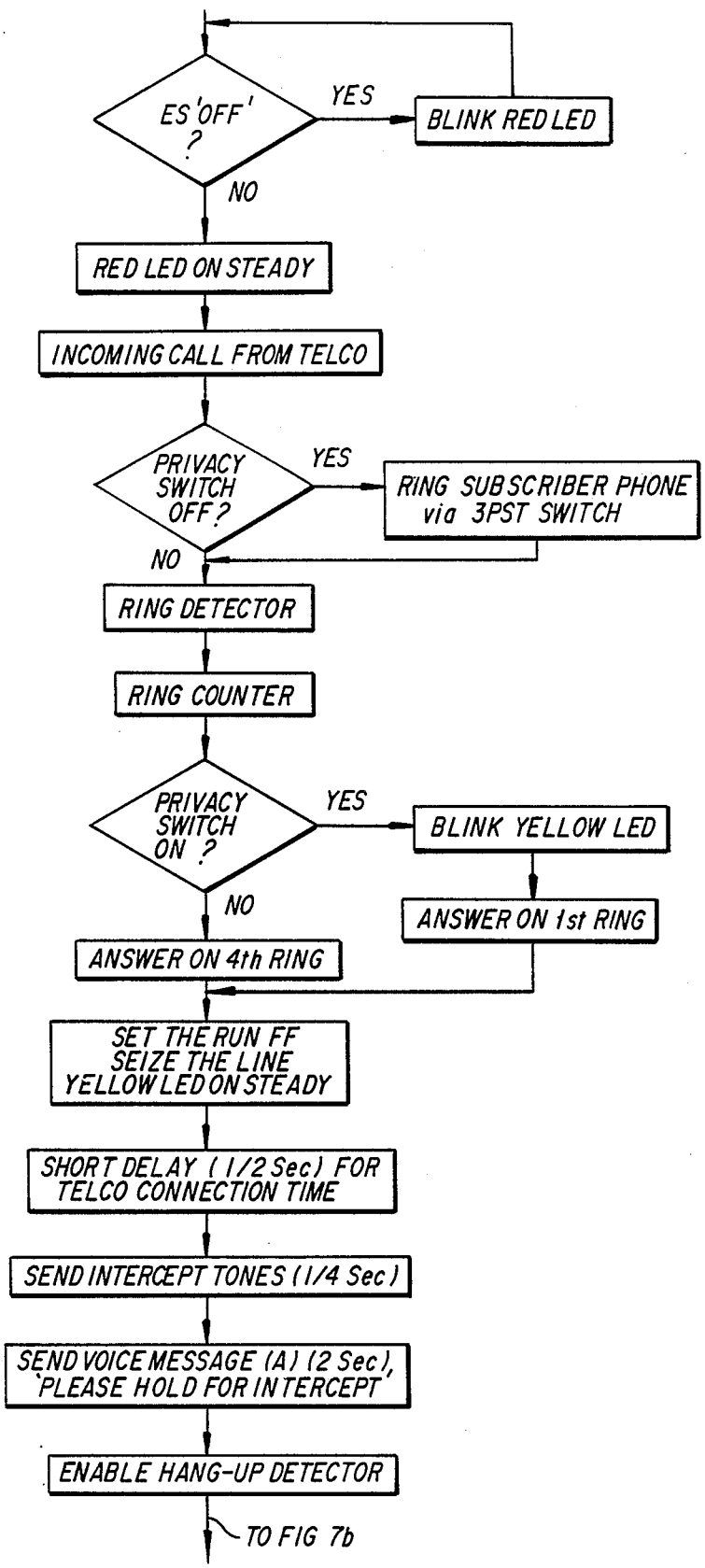
FIG. 7a–c is a flow-chart showing in step-by-step sequence the operation of the conference call diverter section.
Figure 7B:
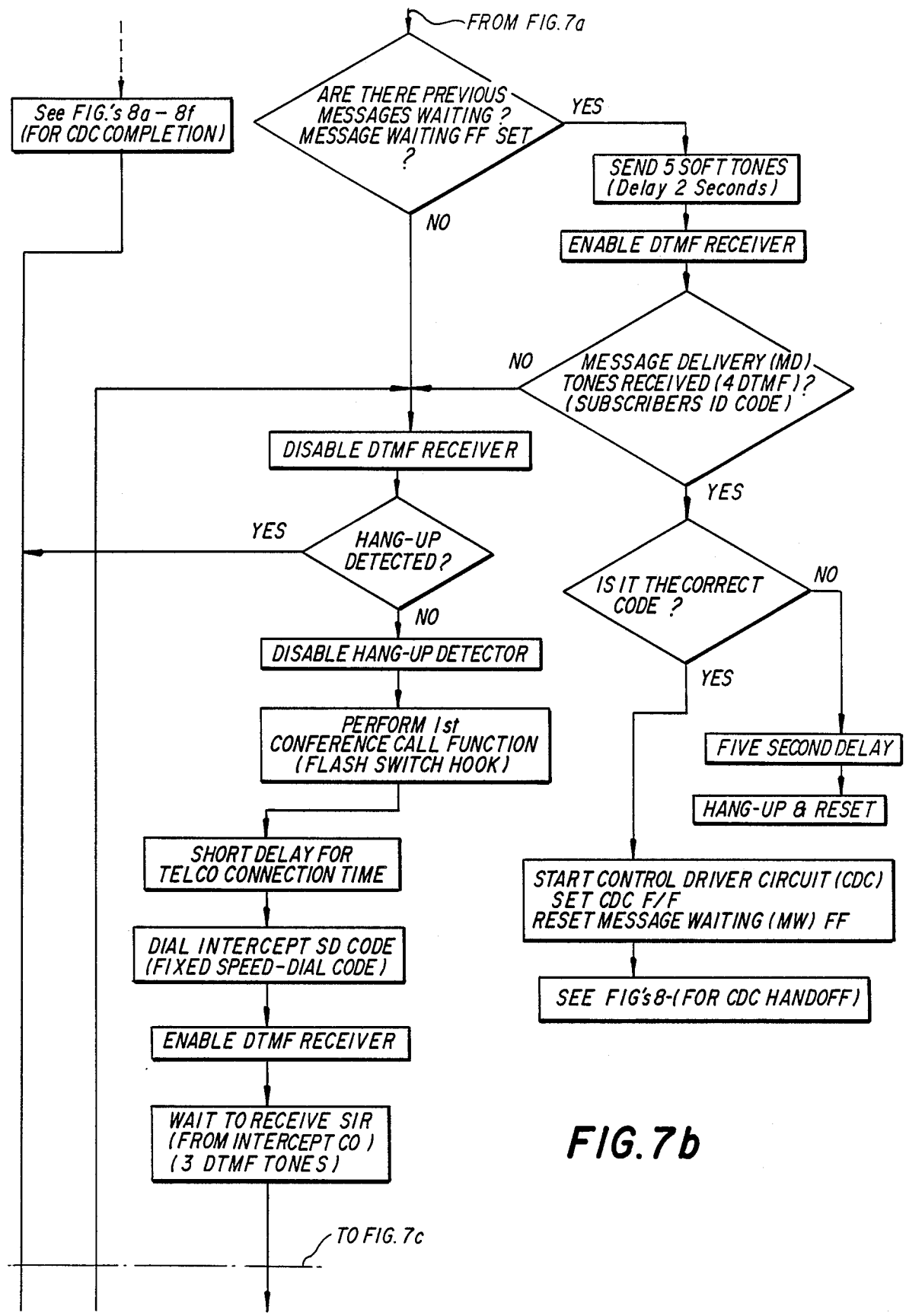
Figure 7C:
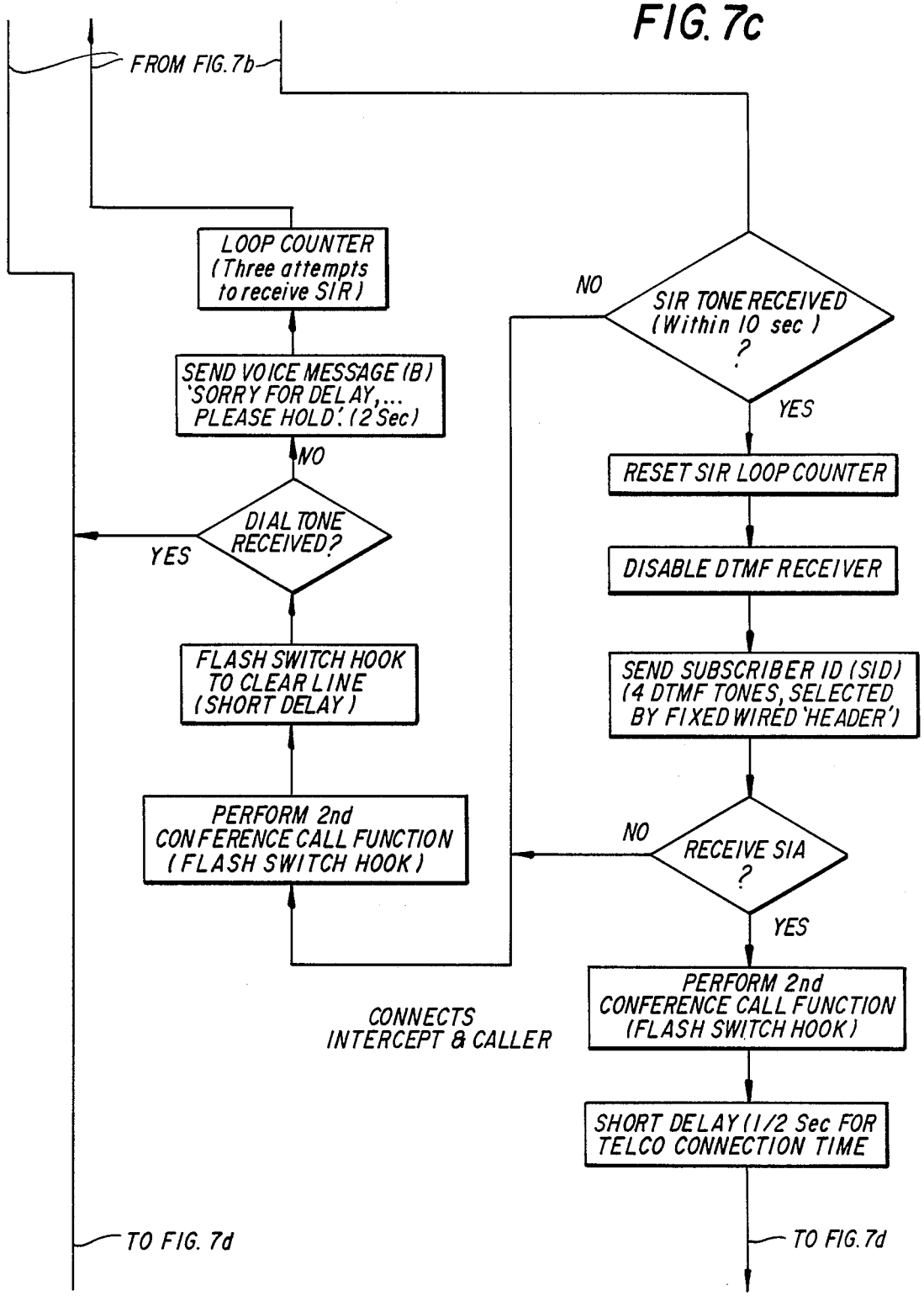
Figure 7D:
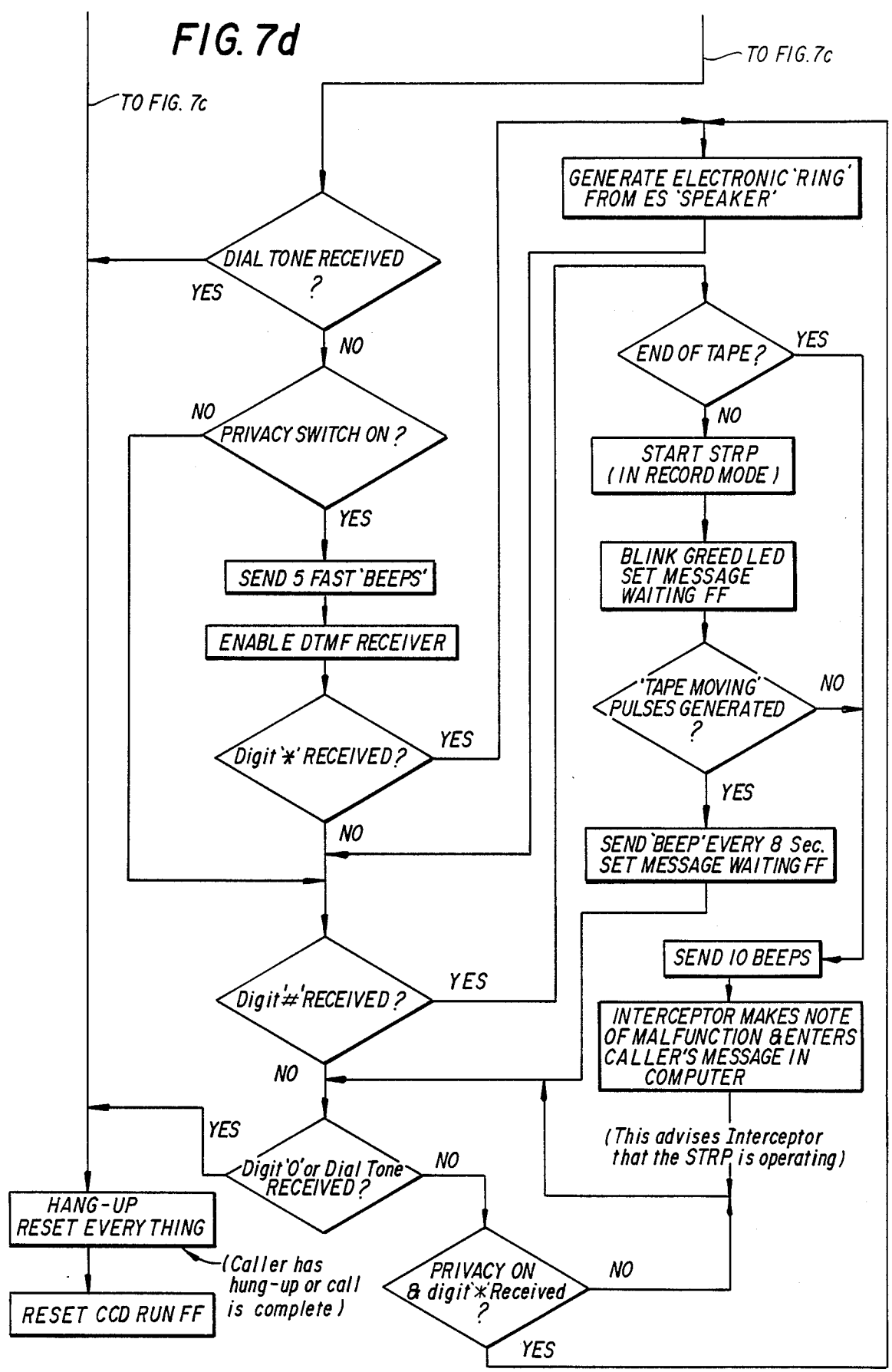
Figure 8A:
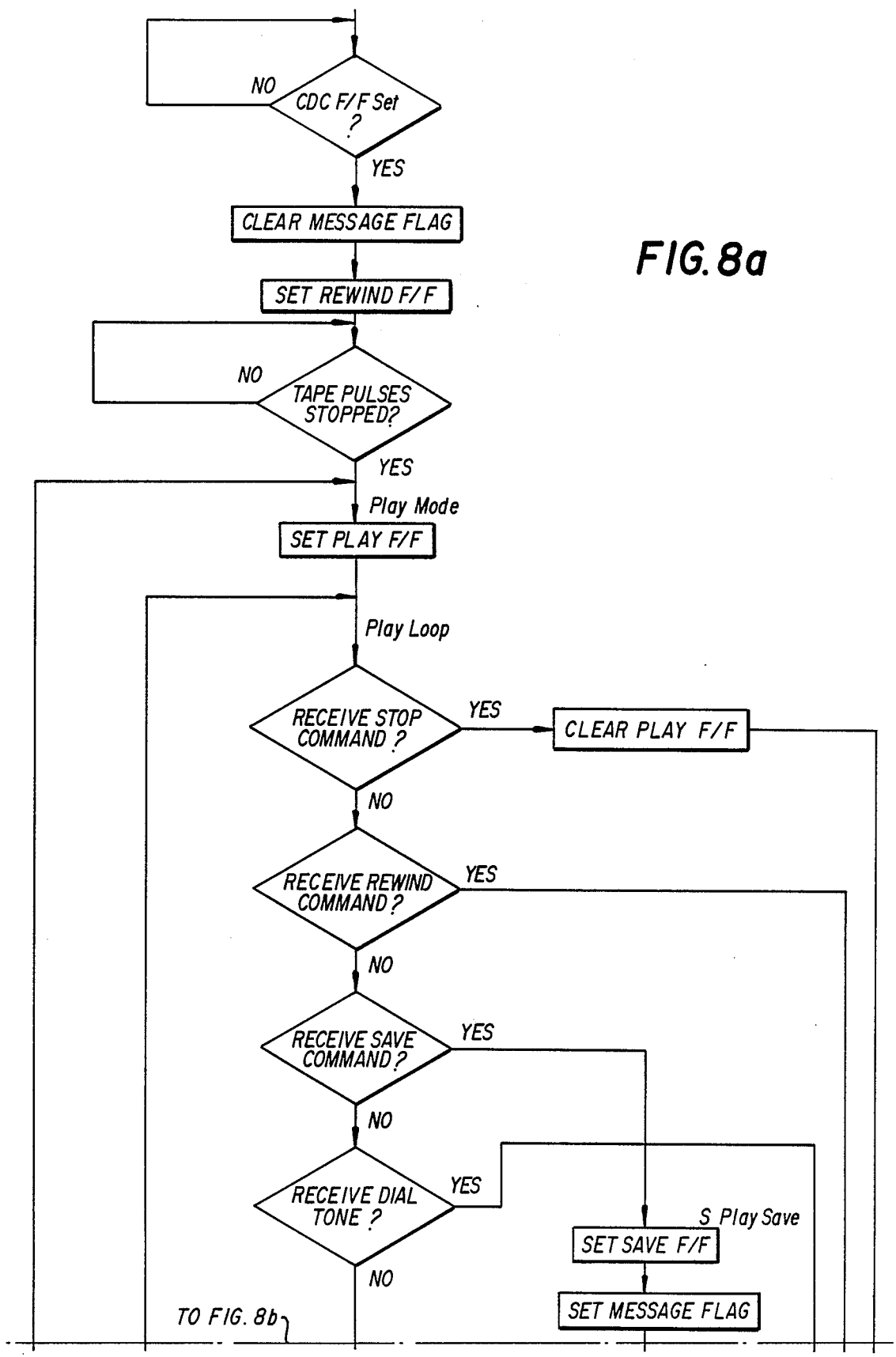
FIGS. 8a–d is a flow-chart showing in step-by-step sequence the operation of the control driver circuit section.
Figure 8B:
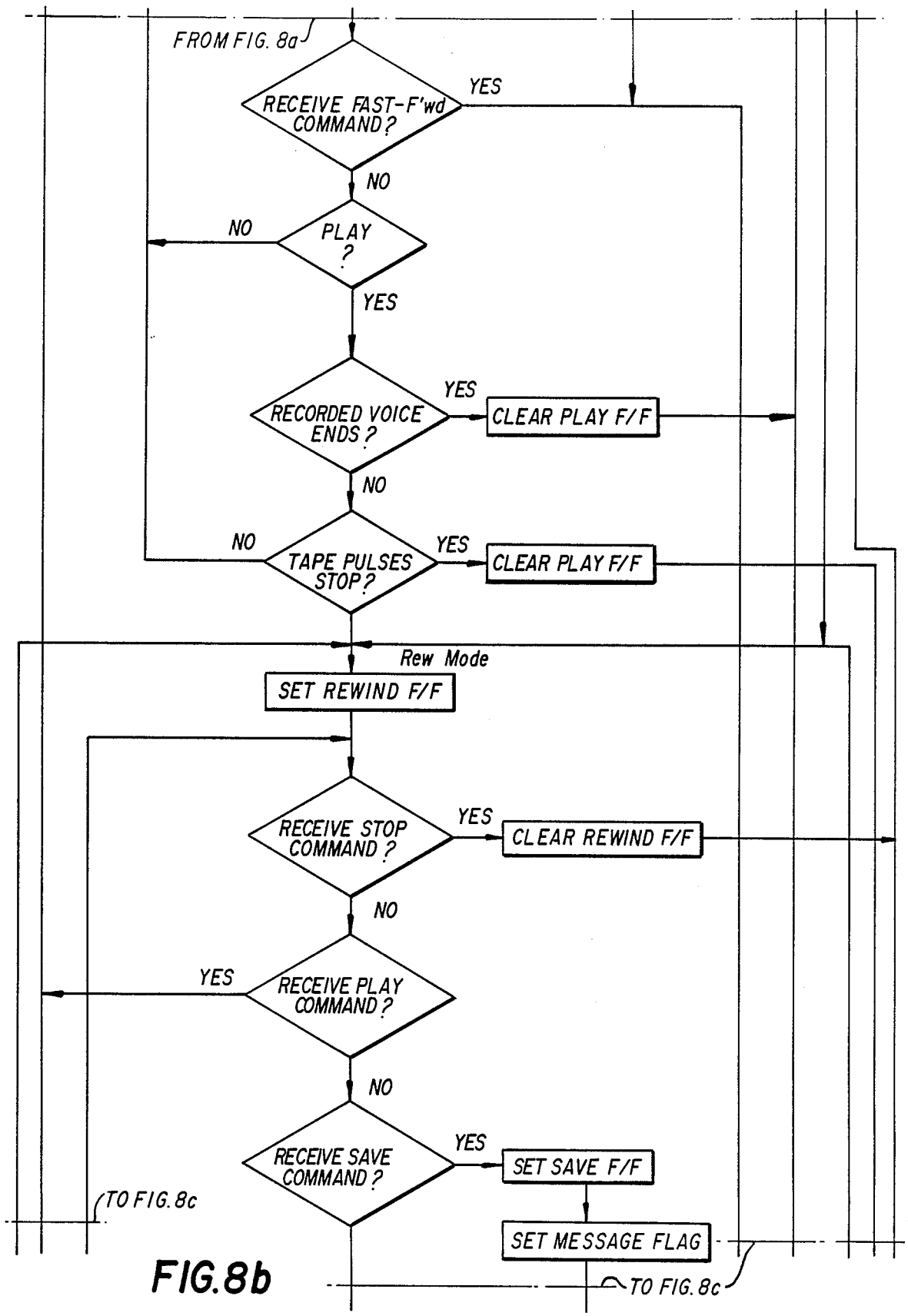
Figure 8C:
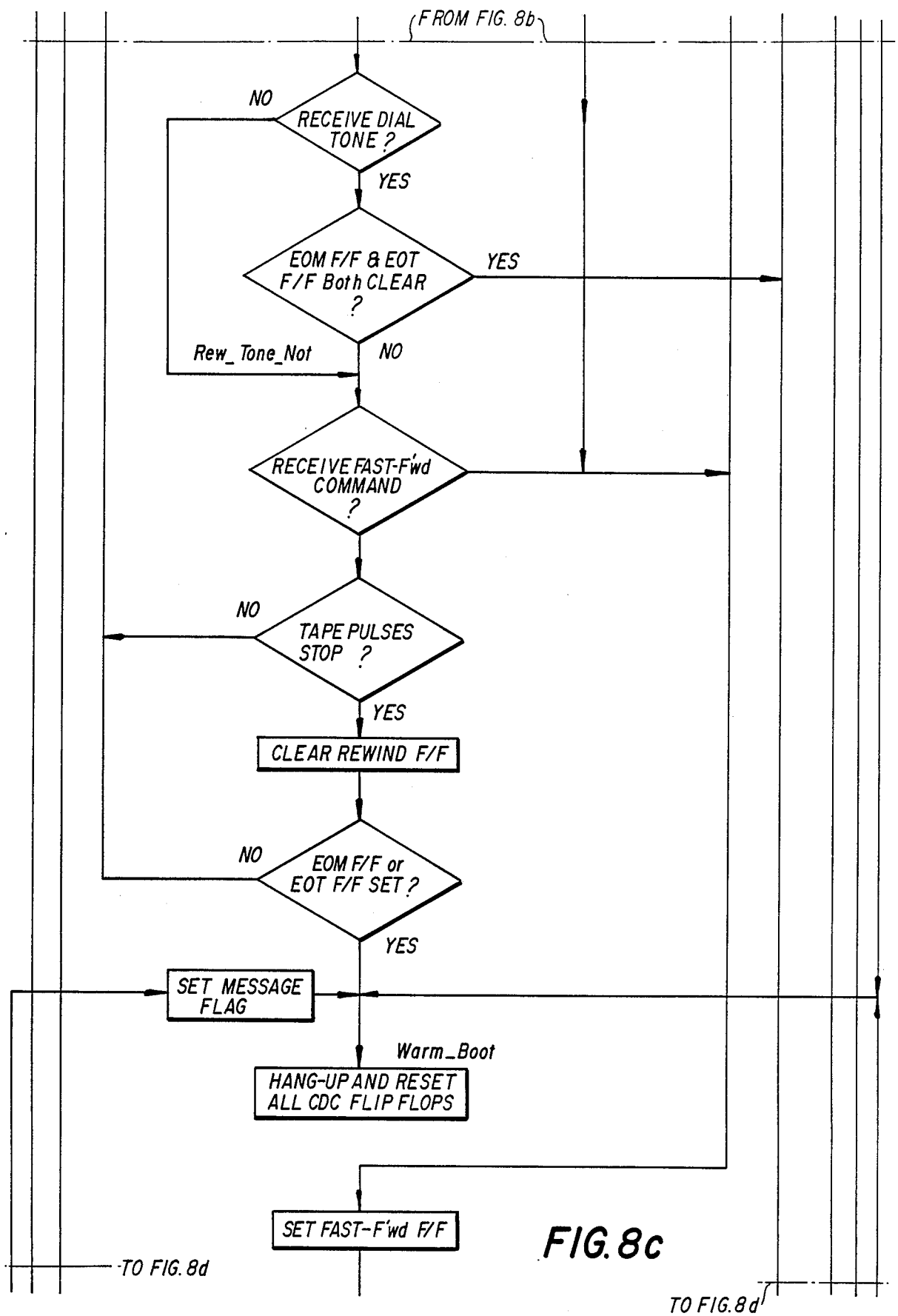
Figure 8D:
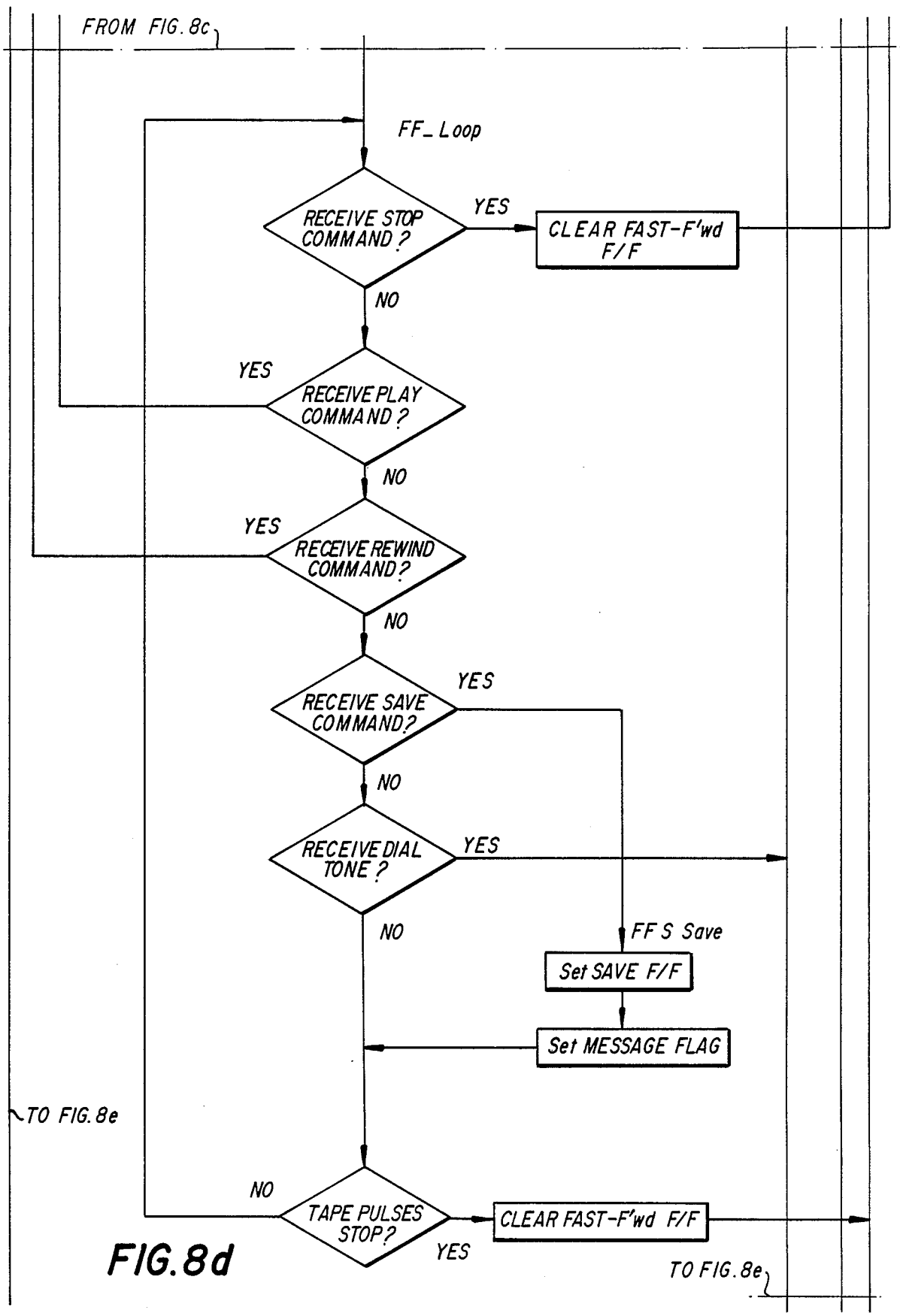
Figure 8F:
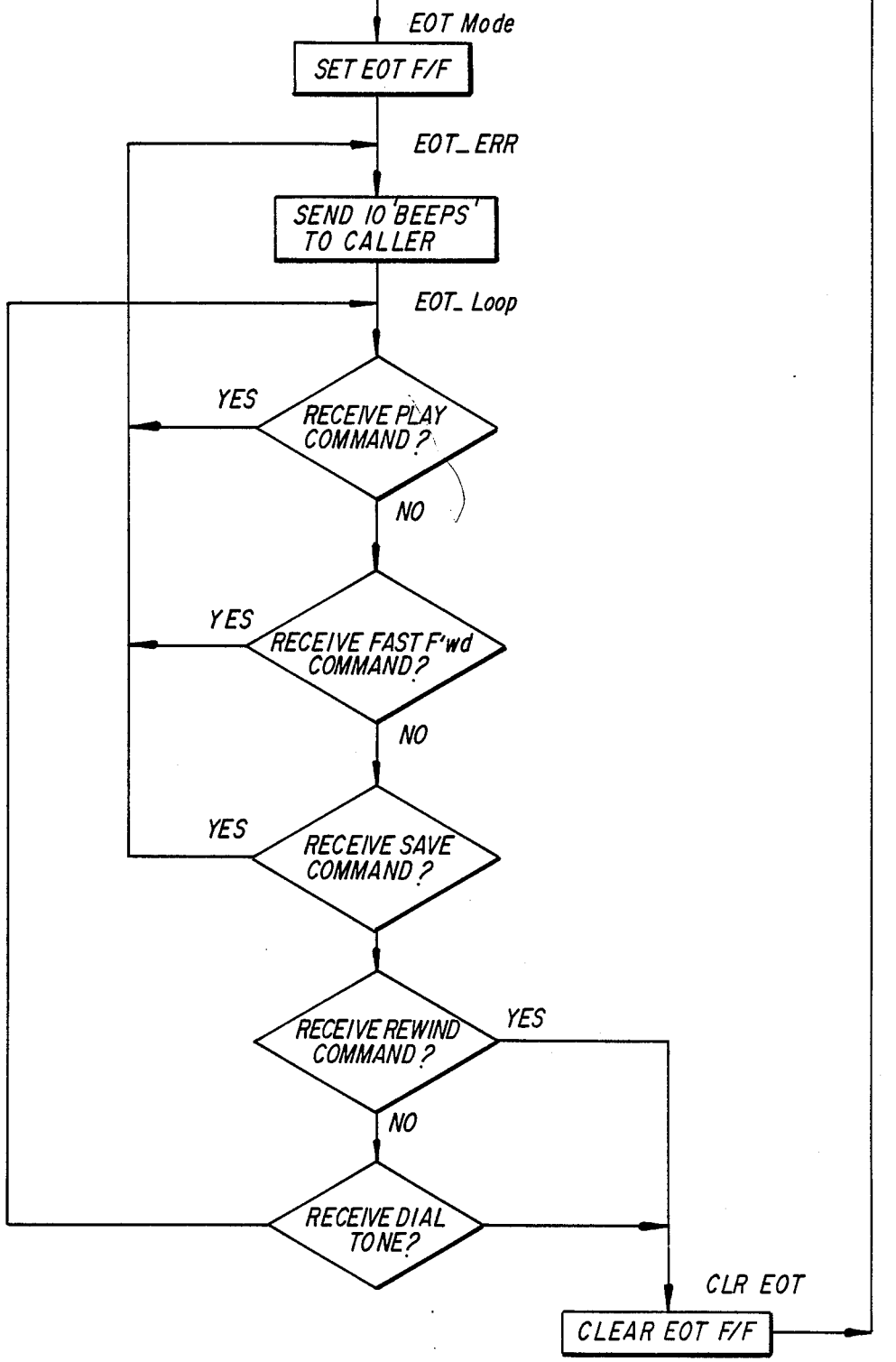

FIGS. 7a–7c show in flowchart form the sequence of steps traversed in performing an intercept operation.

FIGS. 8a–8d show in flowchart form the sequence of steps traversed in performing an intercept operation especially as they relate to control of voice message recorder/player 70.

The steps of the flowcharts 7a–7c and 8a–8d are each described in the flowcharts and are self-explanatory, when taken with the description of the entire intercept system.

The flowchart serves as a base in constructing the control program before they are stored in the control program memory 52.

I claim:

1. Intercept system for intercepting calls from a calling person to an unattended telephone connected to a telephone exchange having three-way calling feature, comprising: at least one intercept console having means for sending a start signal, being attended by an intercept operator, and being connected to the exchange; an intercept adaptor connected to the telephone having: means for generating a specific set of signature tones, automatic dialing means for dialing the intercept console, means for activating the three-way calling feature in response to an incoming call to the telephone; voice recording and playing means; means for sending a digital tone signal identifying the telephone to the intercept operator; signaling means for receiving a start signal from the intercept console to start the voice recording and playing means and receiving a release signal from the intercept console for releasing the three-way calling feature and the intercept adaptor in response to the intercept operator respectively answering the three-way call and releasing it.

2. Intercept system according to claim 1 including means to generate and transmit to a calling person as signature tones, a particular set of informative tones immediately after the incoming call has been answered.

3. Intercept system according to claim 1 including a ring detector disposed in the adaptor, being responsive to a ringing signal from the telephone exchange to the telephone, and three-way calling actuating means for automatically activating the three-way calling feature in response to an output from the ring detector.

4. Intercept system according to claim 3 wherein said three-way calling activating means includes a first flash generated by the intercept adaptor and transmitted to the telephone exchange.

5. Intercept system according to claim 1 wherein said automatic dialing means include a DTMF tone generator.

6. Intercept system according to claim 5 including a number store included in the dialing means for storing the telephone number of the intercept console, said number store operatively engaging the DTMF tone generator for dialing the intercept console.

7. Intercept system according to claim 5 wherein said three-way calling activating means includes a second flash transmitted to the exchange after receiving said start signal for connecting the calling person with the intercept operator via the three-way calling feature.

8. Intercept system according to claim 3 including a ring counter in said intercept adaptor for counting the number of incoming rings from the exchange before the incoming call is answered by the intercept adaptor, and a privacy switch disposed in the intercept adaptor in operative engagement with the ring counter for causing the three-way calling feature to be instantly accessed when said privacy switch is engaged.

9. Intercept system according to claim 1 having a voice synthesizer for responding to and identifying the intercept service to the caller.

10. Intercept system according to claim 1 wherein said signaling means include a signal in operative engagement with the intercept console for sending said start signal in response to the intercept operator answering the three-way call, and a tone receiver disposed in the intercept adaptor, having an output for starting the voice recording and playing means, upon receipt of said start signal.

11. Intercept system according to claim 10, wherein said signal sender serves for sending said release signal operating to release the intercept adaptor, which in turn releases the three-way calling feature.

12. Intercept system according to claim 11 wherein at least one of said start signal and said release signal is a burst of tone.

13. Intercept system according to claim 12, wherein said burst of tone is a burst of DTMF tone.

14. Intercept system according to claim 1 including a micro-processor having a control program in memory for controlling the intercept adaptor, and an adaptor interface having a plurality of input-output latches for operating the adaptor.

15. Intercept system according to claim 14, including a clock-calendar in the microprocessor for providing time and date for each intercept operation.

16. Intercept system according to claim 4 including a dial tone detector in the intercept adaptor for detecting the presence of dial tone from the telephone exchange after sending the first flash and before activating the DTMF generator to dial the telephone number of the intercept console.

17. Intercept system according to claim 16 wherein said dial tone detector in said intercept adaptor detects the presence of dial tone being transmitted from the telephone exchange, in the event that the caller should abort the incoming call by hanging-up, and accordingly causes said intercept adaptor to hang-up and reset its circuits to receive the next incoming call.

18. Intercept system according to claim 1 including a tone receiver and a tone decoder in the intercept console for decoding a subscriber identity signal generated by the intercept adaptor.

19. Intercept system according to claim 5 including means for triggering the transmission of a series of security code DTMF tones disposed in the intercept adaptor for identifying the subscriber's telephone to the intercept console, and a decoder in the intercept adaptor for receiving an acknowledgement tone from the intercept console.

20. Intercept system according to claim 1 including a privacy selector switch disposed in the intercept adaptor for providing subscriber privacy in response to the privacy switch being operated.

21. Intercept system according to claim 1 including a loudspeaker connected to the intercept adaptor being responsive to an alert signal from the intercept console enabling the intercept operator to alert the subscriber in case of an emergency.

22. Intercept system according to claim 1 including a tape recording and transcribing machine, a special control circuit for controlling the recording and transcribing machine disposed in the intercept adaptor, the special control circuit being responsive to at least one of: a plurality of keys on the recording and transcribing machine control panel and command signals generated in the intercept console by means of a plurality of push buttons on the intercept console.

23. Intercept system according to claim 22 including remote tone control means disposed in the intercept adaptor for controlling the recording and transcribing machine, and a DTMF tone decoder operatively engaging a remote telephone for remotely operating the recording and transcribing machine.

24. Intercept system according to claim 22 including storage means being responsive to said recording and transcribing machine for storing the fact that at least one message has been recorded on said recording and transcribing machine.

25. Intercept system according to claim 23 including tone generating means for generating a series of tones at a selected moment after the intercept adaptor has responded to an incoming telephone call as a means for informing a person at said remote telephone that messages are stored on said recording and transcribing machine.

26. Intercept system according to claim 15, including means for selectively programming said clock calendar to activate and deactivate said intercept adaptor at selected times.

27. Intercept system according to claim 26 including remote programming means in said intercept adaptor for remotely programming said clock calendar, said remote programming means being responsive to said DTMF tone dial pad.

28. Intercept system according to claim 27 wherein said remote programming means include means for programming the subscriber identity code.

29. Intercept system according to claim 27 wherein said remote programming means include remote command means for remotely activating or deactivating intercept service to the subscriber.

30. Method for intercepting telephone calls from a calling person to an unattended telephone from a telephone exchange having a three-way calling feature and at least one intercept console attended by an intercept operator connected to the telephone exchange, comprising: detecting a ring signal from the exchange to telephone; accessing in response to the ring signal the three-way calling feature; dialing automatically via the three-way calling feature the intercept console; sending a start signal from the console to the intercept adaptor in response to the console automatically answering the three-way calling feature; sending in response to the start signal a set of stored DTMF tones identifying the telephone from the adaptor to the intercept console; and automatically returning from the console a release signal for releasing the three-way connection to the adaptor in response to the operator terminatng the three-way call.

31. Method according to claim 30 which comprises: sending a flash from the adaptor to the telephone exchange for accessing the three-way calling feature.

32. Method according to claim 31 which comprises: sending another flash from the adaptor to the telephone exchange in response to receiving the start signal for connecting the calling person to the intercept console.

33. Method according to claim 30 which comprises: storing the telephone number of the intercept console in an automatic dialer by means of memory switches.

34. Method according to claim 30 which comprises: dialing, by means of DTMF tones the intercept console.

35. Method according to claim 30 which comprises: detecting three beeps from the exchange before dialing the telephone number of the intercept console.

* * * * *